(12) United States Patent
Ivanchenko

(10) Patent No.: US 9,063,574 B1
(45) Date of Patent: Jun. 23, 2015

(54) MOTION DETECTION SYSTEMS FOR ELECTRONIC DEVICES

(75) Inventor: Volodymyr V. Ivanchenko, Mountian View, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 418 days.

(21) Appl. No.: 13/419,796

(22) Filed: Mar. 14, 2012

(51) Int. Cl.
G09G 5/00 (2006.01)
G06F 3/01 (2006.01)

(52) U.S. Cl.
CPC ............... *G06F 3/017* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 4,836,670 A | 6/1989 | Hutchinson | |
| 5,563,988 A | 10/1996 | Maes et al. | |
| 5,616,078 A | 4/1997 | Oh | |
| 6,272,231 B1 | 8/2001 | Maurer et al. | |
| 6,385,331 B2 | 5/2002 | Harakawa et al. | |
| 6,434,255 B1 | 8/2002 | Harakawa | |
| 6,750,848 B1 | 6/2004 | Pryor | |
| 6,863,609 B2 | 3/2005 | Okuda et al. | |
| 7,301,526 B2 | 11/2007 | Marvit et al. | |
| 7,379,566 B2 | 5/2008 | Hildreth | |
| 7,401,783 B2 | 7/2008 | Pryor | |
| 7,519,223 B2 | 4/2009 | Dehlin et al. | |
| 8,788,977 B2 | 7/2014 | Bezos | |
| 2002/0071277 A1 | 6/2002 | Starner et al. | |
| 2004/0140956 A1 | 7/2004 | Kushler et al. | |
| 2007/0164989 A1 | 7/2007 | Rochford et al. | |
| 2008/0005418 A1 | 1/2008 | Julian | |
| 2008/0013826 A1 | 1/2008 | Hillis et al. | |
| 2008/0019589 A1 | 1/2008 | Yoon et al. | |
| 2008/0040692 A1 | 2/2008 | Sunday et al. | |

(Continued)

FOREIGN PATENT DOCUMENTS

| | | |
|---|---|---|
| CN | 1694045 | 11/2005 |
| GB | 2440348 | 1/2008 |

(Continued)

OTHER PUBLICATIONS

Brashear, H. et al., "Using Multiple Sensors for Mobile Sign Language Recognition," International Symposium on Wearable Computers, Oct. 2003, 8 pages.

(Continued)

*Primary Examiner* — Adam R Giesy
*Assistant Examiner* — Henok Heyi
(74) *Attorney, Agent, or Firm* — Novak Druce Connolly Bove + Quigg LLP

(57) ABSTRACT

The amount of power and processing needed to process gesture input for a computing device can be reduced by utilizing a separate gesture sensor. The gesture sensor can have a form factor similar to that of conventional camera elements, in order to reduce costs by being able to utilize readily available low cost parts, but can have a lower resolution and adjustable virtual shutter such that fast motions can be captured and/or recognized by the device. In some devices, a subset of the pixels of the gesture sensor can be used as a motion detector, enabling the gesture sensor to run in a low power state unless there is likely gesture input to process. Further, at least some of the processing and circuitry can be included with the gesture sensor such that various functionality can be performed without accessing a central processor or system bus, thus further reducing power consumption.

24 Claims, 10 Drawing Sheets

(56) References Cited

U.S. PATENT DOCUMENTS

| | | | |
|---|---|---|---|
| 2008/0136916 | A1 | 6/2008 | Wolff |
| 2008/0158096 | A1 | 7/2008 | Breed |
| 2008/0174570 | A1 | 7/2008 | Jobs et al. |
| 2008/0266257 | A1 | 10/2008 | Chiang |
| 2008/0266530 | A1 | 10/2008 | Takahashi et al. |
| 2008/0276196 | A1 | 11/2008 | Tang |
| 2009/0031240 | A1 | 1/2009 | Hildreth |
| 2009/0079813 | A1 | 3/2009 | Hildreth |
| 2009/0265627 | A1 | 10/2009 | Kim et al. |
| 2009/0313584 | A1 | 12/2009 | Kerr et al. |
| 2012/0007713 | A1* | 1/2012 | Nasiri et al. ............. 340/5.81 |
| 2012/0148224 | A1* | 6/2012 | Pozniansky et al. .......... 396/153 |
| 2013/0082978 | A1* | 4/2013 | Horvitz et al. ............... 345/175 |
| 2013/0222638 | A1* | 8/2013 | Wheeler et al. ........... 348/231.2 |
| 2014/0285435 | A1 | 9/2014 | Bezos |

FOREIGN PATENT DOCUMENTS

| | | |
|---|---|---|
| IN | 2061/KOLNP/2011 | 9/2011 |
| JP | 2002-164990 | 6/2002 |
| JP | 2002-351603 | 12/2002 |
| JP | 2004-318826 | 11/2004 |
| JP | 2007-121489 | 5/2007 |
| JP | 2008-97220 | 4/2008 |
| JP | 2008-186247 | 8/2008 |
| KR | 10-1312227 | 9/2013 |
| WO | 0215560 | 2/2002 |
| WO | 2006036069 | 4/2006 |

OTHER PUBLICATIONS

Consumerreports.org., "Face Detection, Technology Puts Portraits in Focus," located at <http://www.consumerreports.org/cro/electronics-computers/camera-photograph/cameras-c . . . >, Nov. 2007, last accessed on Feb. 6, 2009, 1 page.

Nintendo Games, "Introducing the Wii MotionPlus, Nintendo's Upcoming Accessory for the Revolutionary Wii Remote at Nintendo:: What's New," located at <http://www.nintendo.com/whatsnew/detail/eMMuRj__N6vntHPDycCJAKWhEO9zBvyPH>, Jul. 14, 2008, last accessed on Feb. 6, 2009, 2 pages.

Padilla, R., Eye Toy, located at <http://www.archive.gamespy.com/hardware/august03/eyetoyps2/index.shtml>, Aug. 16, 2003, last accessed on Feb. 6, 2009, 2 pages.

Schneider, J., "Does Face Detection Technology Really Work? Can the Hottest New Digital Camera Feature of 2007 Actually Improve your People Pictures? Here's the Surprising Answer!" located at <http://www.adorama.com/catalog.tpl?article=052107 &op=academy_new>, May 21, 2007, last accessed on Feb. 6, 2009, 5 pages.

Tyser, P., "Control an iPod with Gestures," located at <http://www.videsignline.com/howto/170702555>, Sep. 11, 2005, last accessed on Feb. 6, 2009, 4 pages.

Zyga, L., "PHYSorg.com, Hacking the Wii Remote for Physics Class," located at <http://www.physorg.com/news104502273.html>, Jul. 24, 2007, last accessed on Feb. 6, 2009, 2 pages.

"International Search Report mailed on Apr. 7, 2010," International Application No. PCT/US2009/065364, 2 pages.

Cornell, J., "Does This Headline Know You're Reading It?" h+ Magazine, Mar. 19, 2010, located at <http://hplusmagazine.com/articles/ai/does-headline-know-you%E2%80%99re-reading-it>, last accessed on Jun. 7, 2010, 4 pages.

Haro, A. et al., Mobile Camera-Based Adaptive Viewing, 2005, MUM '05 Proceedings of the 4th International Conference on Mobile and Ubiquitous Multimedia.

Nokia N95 8GB Data Sheet, 2007, Nokia.

"Non-Final Office Action mailed Jun. 10, 2011," U.S. Appl. No. 12/332,049, 48 pages.

"Final Office Action mailed Oct. 27, 2011," U.S. Appl. No. 12/332,049, 66 pages.

"Non-Final Office Action mailed Nov. 7, 2012," U.S. Appl. No. 12/332,049, 64 pages.

"Final Office Action mailed Jun. 6, 2013," U.S. Appl. No. 12/332,049, 70 pages.

"Canadian Office Action dated May 13, 2013," Canadian Applicaiton No. 2,743,914, 2 pages.

"First Office Action dated Mar. 22, 2013," Chinese Application No. 200980146841.0, 9 pages.

"International Preliminary Report on Patentability and Written Opinion dated Apr. 7, 2010," International Application No. PCT/US2009/065364, 7 pages.

"Non-Final Office Action dated Dec. 21, 2012," Korean Application No. 10-2011-7013875, 3 pages.

"Non-Final Office Action dated Apr. 2, 2013," Japanese Application No. 2011-537661, 2 pages.

"Notice of Allowance dated Mar. 4, 2014," U.S. Appl. No. 12/332,049, 8 pages.

"Non-Final Office Action dated Oct. 6, 2014," U.S. Appl. No. 14/298,577, 9 pages.

"Reexamination Report dated Sep. 9, 2014," Japanese Application No. 2011-537661, 2 pages.

"Final Rejection dated Feb. 4, 2014," Japanese Application No. 2011-537661, 2 pages.

"Supplemental European Search Report dated Jul. 8, 2014," European Application No. 09828299.9, 13 pages.

"Second Office Action dated Nov. 5, 2013," Chinese Application No. 200980146841.0, 9 pages.

"Third Office Action dated May 20, 2014," Chinese Application No. 200980146841.0, 4 pages.

"Examiner's Report dated Mar. 31, 2014," Canada Application No. 2,743,914, 3 pages.

\* cited by examiner

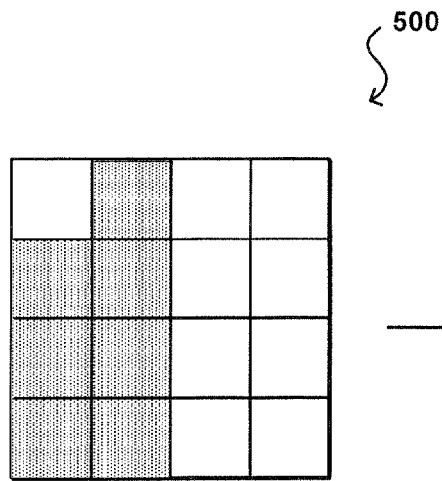 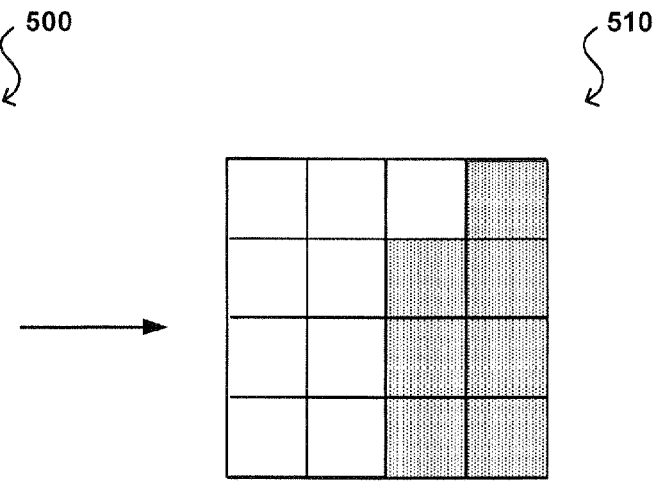
FIG. 5(a)  FIG. 5(b)
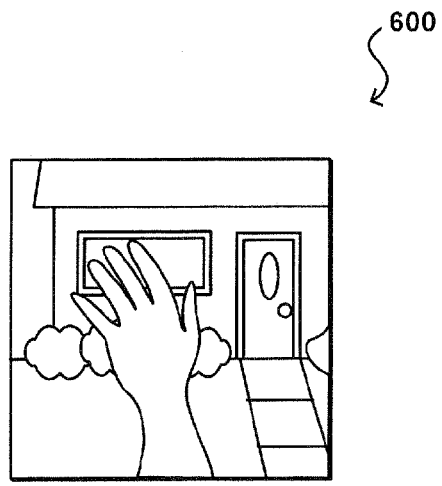 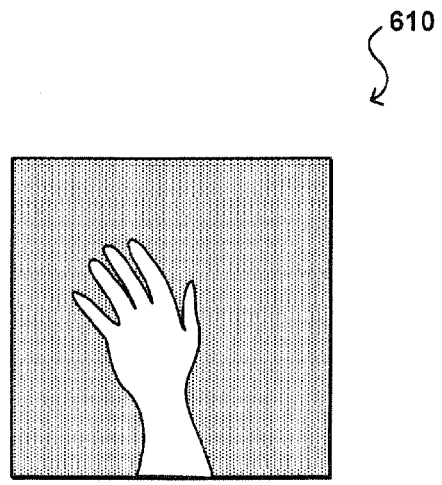
FIG. 6(a)  FIG. 6(b)

MOTION DETECTION SYSTEMS FOR ELECTRONIC DEVICES

BACKGROUND

People are increasingly interacting with computers and other electronic devices in new and interesting ways. One such interaction approach involves making a detectable motion with respect to a device, which can be detected using a camera or other such element. While image recognition can be used with existing cameras to determine various types of motion, the amount of processing needed to analyze full color, high resolution images is generally very high. This can be particularly problematic for portable devices that might have limited processing capability and/or limited battery life, which can be significantly drained by intensive image processing. Some devices utilize basic gesture detectors, but these detectors typically are very limited in capacity and only are able to detect simple motions such as up-and-down, right-or-left, and in-and-out. These detectors are not able to handle more complex gestures, such as holding up a certain number of fingers or pinching two fingers together.

Further, cameras in many portable devices such as cell phones often have what is referred to as a "rolling shutter" effect. Each pixel of the camera sensor accumulates charge until it is read, with each pixel being read in sequence. Because the pixels provide information captured and read at different times, as well as the length of the charge times, such cameras provide poor results in the presence of motion. A motion such as waiving a hand or a moving of one or more fingers will generally appear as a blur in the captured image, such that the actual motion cannot accurately be determined.

BRIEF DESCRIPTION OF THE DRAWINGS

Various embodiments in accordance with the present disclosure will be described with reference to the drawings, in which:

FIGS. 5(a) and 5(b) illustrate an example of detectable motion in low resolution images in accordance with various embodiments;

FIGS. 6(a) and 6(b) illustrate example images for analysis with different types of illumination in accordance with various embodiments;

DETAILED DESCRIPTION

Figure 1:
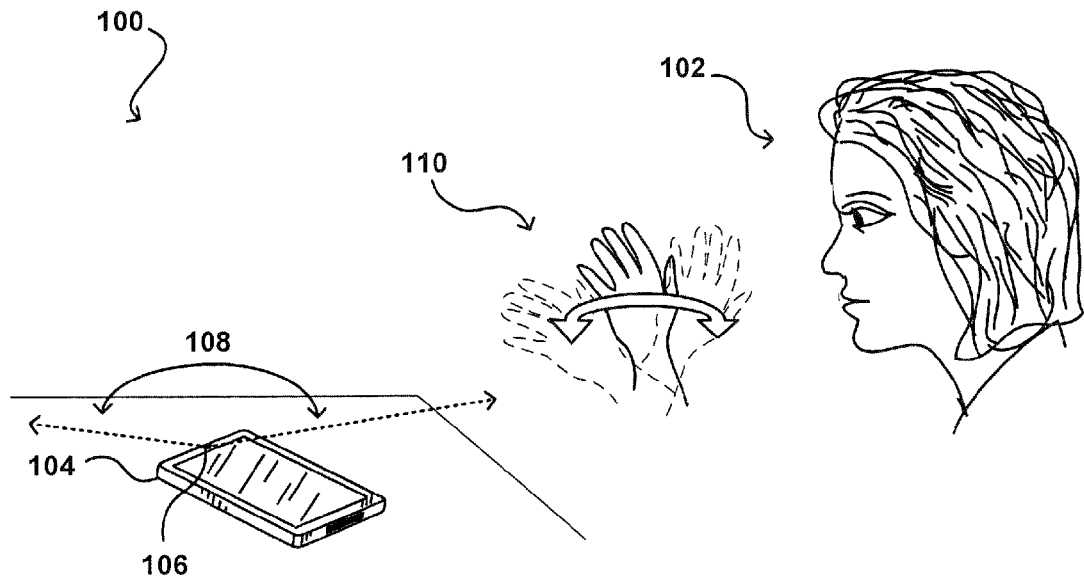
FIG. 1 illustrates an example environment in which various aspects can be implemented in accordance with various embodiments.

Systems and methods in accordance with various embodiments of the present disclosure may overcome one or more of the aforementioned and other deficiencies experienced in conventional approaches to controlling functionality or otherwise providing input in an electronic environment. In particular, various approaches provide approaches to determining and enabling gesture- and/or motion-based input for an electronic device. Such approaches enable relatively complex gestures to be interpreted with lower cost and power consumption than conventional approaches. Further, these approaches can be implemented in a camera-based sensor subsystem in at least some embodiments, which can be utilized advantageously in devices such as tablet computers, smart phones, electronic book readers, and the like.

In at least one embodiment, a gesture sensor can be utilized that has a form factor similar to that of a conventional camera element, such that any of a number of available, low cost lenses and other such elements can be utilized. In other embodiments, the gesture sensor might be smaller than a conventional camera element, such as ⅓ or ¼ of the size of a conventional camera or less. In still other embodiments, a gesture sensor can correspond to a specific operational mode of one or more cameras or other such components on a computing device. A gesture sensor in accordance with some embodiments can utilize a smaller number or pixels, which may be larger pixels than those of conventional camera elements in some embodiments, and can provide for virtual shutters of the individual pixels. Such an approach provides various advantages, including reduced power consumption and lower resolution images that require less processing capacity while still providing sufficient resolution for gesture recognition. Further, the ability to provide a virtual shutter for the gesture sensor enables each pixel to capture information at substantially the same time, with substantially the same exposure time, eliminating most blur issues found with rolling shutter elements. The shutter speed also can be adjusted as necessary due to a number of factors, such as device-based illumination and ambient light, in order to effectively freeze motion and provide for enhanced gesture determination.

In at least some embodiments, a subset of the pixels on a gesture sensor can be used as a low power motion detector. The intensity at various locations can be monitored and compared, and certain changes indicative of motion can cause the gesture sensor to "wake up" or otherwise become fully active and attempt, at full or other increased resolution, to determine whether the motion corresponds to a gesture. If the motion corresponds to a gesture, other functionality on the device can be activated as appropriate, such as to trigger a separate camera element to perform facial recognition or another such process.

In at least some embodiments, portions of the circuitry and/or functionality can be contained on the chip containing the gesture sensor. For example, switching from a motion detection mode to a gesture analysis mode can be triggered on-chip, avoiding the need to utilize a system bus or central processor, thereby conserving power and device resources. The chip can also contain logic and functionality enabling various components, such as higher resolution cameras or motion determination elements, to be activated without also waking up a main device processor. In at least some embodiments, the chip can buffer and/or store an amount of captured image information for use in subsequent analysis when a likely gesture is detected in the captured image information. Other functions can be triggered from the chip as well, such as the timing of an LED or other such illumination element.

In at least some embodiments, a portable computing device will include at least one motion-determining object, such as an accelerometer or electronic gyroscope. An electronic gyroscope, for example, provides information indicating a speed of rotation that can be used to determine and/or track device rotation over time. By determining an approximate amount of device rotation between images, any position shifting between the images can be accounted for in order to align the images for analysis. As discussed later herein, objects in the foreground and background move together upon a device rotation. By knowing the angular capture range of the camera or other imaging element capturing the images, a calculation can be performed to determine an amount of lateral translation necessary to account for a determined amount of angular rotation of the computing device.

Various lighting and capture approaches can also be used in accordance with various embodiments. For example, ambient light or infrared imaging can be used to capture image information for use in determining a type of location of the device, as well as the locations of various features relative to the device. In some embodiments, a combination of ambient and infrared imaging can be used to assist in removing background objects from the captured image information in order to simplify, and improve the accuracy of, image processing. The information can be captured using any appropriate sensor or detector, such as a digital camera or infrared detector. Further, two or more imaging elements can be used together in at least some embodiments to provide position information in three dimensions. In at least some embodiments, this functionality can be activated and at least some of the results analyzed without first activating a device processor.

Various other applications, processes and uses are presented below with respect to the various embodiments.

FIG. 1 illustrates an example situation 100 wherein a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another image capturing technology.

In this example, the user 102 is performing a selected motion or gesture using the user's hand 110. The motion can be one of a set of motions or gestures recognized by the device to correspond to a particular input or action. If the motion is performed within a viewable area or angular range 108 of at least one of the imaging elements 106 on the device, the device can capture image information including the motion, analyze the image information using at least one image analysis or feature recognition algorithm, and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference.

As discussed above, however, analyzing full color, high resolution images from one or more cameras can be very processor, resource, and power intensive, particularly for mobile devices. Conventional complementary metal oxide semiconductor (CMOS) devices consume less power than other conventional camera sensors, such as charge coupled device (CCD) cameras, and thus can be desirable to use as a gesture sensor. While relatively low resolution CMOS cameras such as CMOS VGA cameras (i.e., with 256×256 pixels, for example) can be much less processor-intensive than other such cameras, these CMOS cameras typically are rolling shutter devices, which as discussed above are poor at detecting motion. Each pixel is exposed and read at a slightly different time, resulting in apparent distortion when the subject and the camera are in relative motion during the exposure. CMOS devices are advantageous, however, as they have a relatively standard form factor with many relatively inexpensive and readily available components, such as lenses and other elements developed for webcams, cell phone, notebook computers, and the like. Further, CMOS cameras typically have a relatively small amount of circuitry, which can be particularly advantageous for small portable computing devices, and the components can be obtained relatively cheaply, at least with respect to other types of camera sensor.

Approaches in accordance with various embodiments can take advantage of various aspects of CMOS camera technology, or other such technology, to provide a relatively low power but highly accurate gesture sensor that can utilize existing design and implementation aspects to provide a sensible solution to gesture detection. Such a gesture sensor can be used in addition to a conventional camera, in at least some embodiments, which can enable a user to activate or control aspects of the computing device through gesture or movement input, without utilizing a significant amount of resources on the device.

Figure 2:
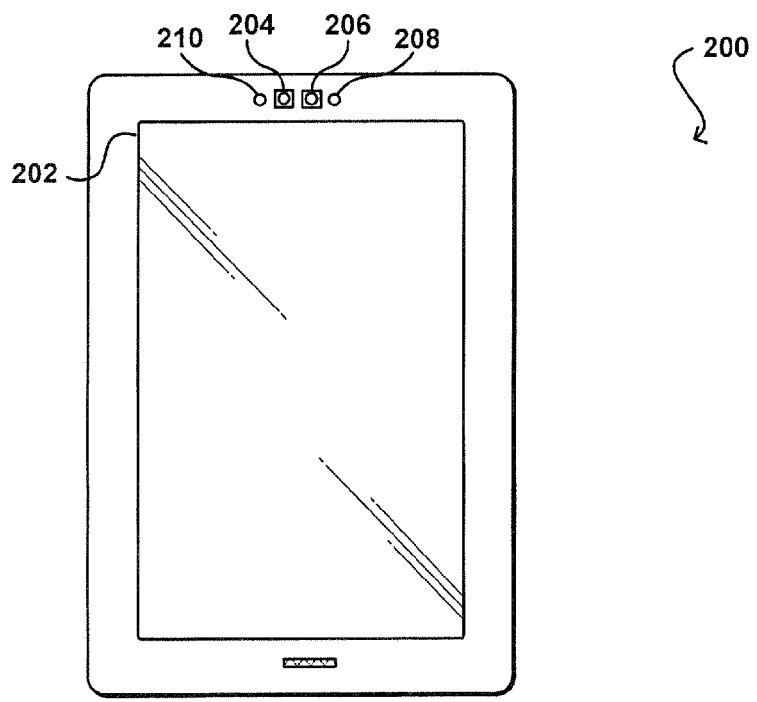
FIG. 2 illustrates an example computing device that can be used in accordance with various embodiments.

For example, FIG. 2 illustrates an example computing device 200 that can be used in accordance with various embodiments. In this example, the device has a conventional digital camera 204 on a same side of the device as a display element 202, enabling the device to capture image information about a user of the device during typical operation where the user is at least partially in front of the display element. In addition, there is a gesture sensor 206 positioned on the same side of the device that can be used to determine gesture input from the user when at relatively the same location. It should be understood that there can be additional cameras, gesture sensors, or other such elements on the same or other sides or locations of the device as well within the scope of the various embodiments, such as may enable gesture or image input from any desired direction or location with respect to the device. Further, in some embodiments a gesture sensor might be a lower power or lower resolution mode of operation of at least one conventional camera of the device. A camera and gesture sensor can be used together advantageously in various situations, such as where a device wants to enable gesture recognition at relatively low power over an extended period of time using the gesture sensor, and perform facial recognition or other processor and power intensive processes at specific times using the conventional, higher resolution camera.

In this example, it can be seen that the camera 204 and gesture sensor 206 have essentially the same form factor. As discussed, in at least some embodiments a gesture sensor can utilize the shape and/or size of a conventional camera, which can enable the use of readily available and inexpensive parts, and a relatively short learning curve since much of the basic technology and operation may be already known. This example device also illustrates additional elements that can be used as discussed later herein, including a light sensor 208 for determining an amount of light in a general direction of an image to be captured and an illumination element 210, such as a white light emitting diode (LED) or infrared (IR) emitter as will be discussed later herein, for providing illumination in a particular range of directions when, for example, there is insufficient ambient light determined by the light sensor. Various other elements and combinations of elements can be used as well within the scope of the various embodiments as should be apparent in light of the teachings and suggestions contained herein.

As discussed, conventional low-cost CMOS devices typically do not have a true electronic shutter, and thus suffer from the rolling shutter effect. While this is generally accepted in order to provide high resolution images in a relatively small package, gesture detection does not require high resolution images for sufficient accuracy. For example, a relatively low resolution camera can determine that a person is nodding his or her head left to right, even if the resolution is too low to determine the identity of that person in the image. Even when the device is attempting to determine the direction in which a user is glancing, which requires analyzing information about the user's eyes as captured in the image information, a relatively low resolution image is generally sufficient. While a very small camera with low resolution can be used, it can be desirable at least from a cost-savings standpoint to utilize a known form factor for which parts are readily available and inexpensive.

Figure 3A:
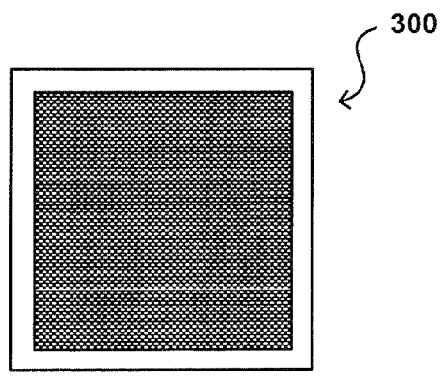
FIGS. 3(a) and 3(b) illustrate a conventional camera sensor and a gesture sensor having a similar form factor that can be used in accordance with various embodiments.
Figure 3B:
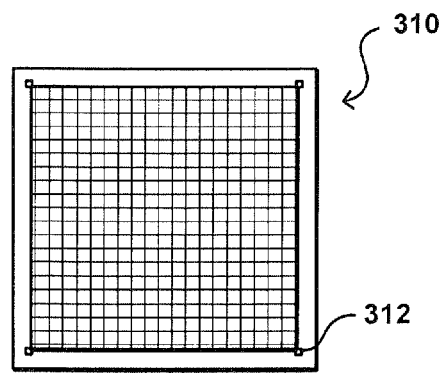

Accordingly, an approach that can be used in accordance with various embodiments discussed herein is to utilize the basic form factor and components of a conventional camera, such as CMOS VGA camera. An example of a VGA sensor 300 is illustrated in FIG. 3(*a*), although it should be understood that the illustrated grid is merely representative of the pixels of the sensor and that there can be hundreds to thousands of pixels or more along each side of the sensor. Further, although the sensors shown are essentially square it should be understood that other shapes or orientations can be used as well, such as may include rectangular or circular active areas. FIG. 3(*b*) illustrates an example of a gesture sensor 310 that can be used in accordance with various embodiments. As can be seen, the basic form factors and components can be similar to, or the same as, for the conventional camera sensor. In this example, however, there are fewer pixels representing a lower resolution device. Because the form factor is the same, the fewer number of pixels results in larger pixel size (or in some cases a larger separation between pixels, etc.).

In at least some embodiments, the gesture sensor can have a resolution on the order of quarter VGA (QVGA) resolution, with a resolution of 320×240 pixels in at least some embodiments. Other formats include, but are not limited to, 256×256 pixels (65,536 pixels) or similar low resolution imagers with lower than VGA resolution (300,000 pixels). Since the capture area is essentially unchanged, the relative size of the pixels can depend on the resolution with respect to conventional VGA sensors.

An advantage to having a relatively smaller number of larger pixels is that global shuttering can be incorporated with the pixels without a need to increase the size of the die containing the sensor. As discussed, a small die size can be important for factors such as device cost (which scales with die area), device size (which is driven by die area), and the associated lenses and costs (also driven at least in part by die area). It also can be easier to extend the angular field of view of various lens elements (i.e., beyond 60 degrees diagonal) for smaller, low resolution die. Further, the ability to use a global shutter enables all pixels to be read at essentially the same time, and enables the device to control how much time the pixels are exposed to, or otherwise able to capture, incident light. Such an approach not only provides significant improvement in capturing items in motion, but also can provide significant power savings in many examples. As an example, FIG. 4(*a*) illustrates in a diagrammatic fashion an example 400 of the type of problem encountered by a rolling shutter camera when trying to capture a waving hand. As can be seen, there is a significant amount of blur or distortion that can prevent a determination of the precise, or even approximate, location of the hand in this frame for comparison against subsequent and/or preceding frames.

In at least some embodiments, the pixels of a gesture sensor are provided in pairs, with one pixel being exposed to the incident light and another shielded from the light, such as by using a piece of aluminum between the shielded pixel and the collecting optic. The collecting pixel can serve as a storage area for the exposed pixel, along with one or more transistors or other such elements for temporarily holding a charge. Using such an approach, all (or at least a set of) the exposed pixels can be exposed to incident light at substantially the same time for substantially the same length of time. Once that period is over, the captured charge due to the incident light is transferred from each exposed pixel to its corresponding shielded pixel. The shielded pixel can store the charge until the charge can be read by the device. Such an approach enables the exposed pixels to capture charge at substantially the same time, even though the stored charge might be read from the shielded pixels at different times, such as in sequence. Thus, the sensor can have a very fast effective shutter speed, limited only (primarily) by the speed at which the pixels can be exposed and then drained. The sensor thus can capture images of objects, even when those objects are in motion, with very little blur. For example, FIG. 4(*b*) illustrates an example of an image 410 that can be captured of a hand while the hand is engaged in a waving motion. Due at least in part to the fast shutter speed and the near simultaneous reading of the pixels, the approximate location of the hand at the time of capture of the image can readily be determined.

Figure 4A:
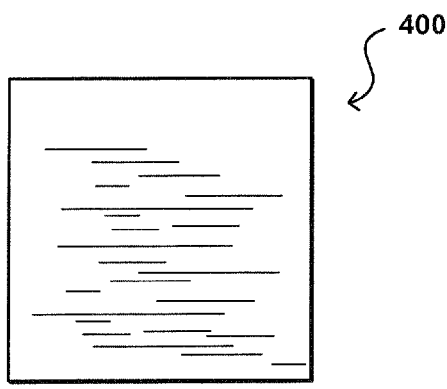
FIGS. 4(a), (b), (c), and (d) illustrate examples of images of a hand in motion that can be captured in accordance with various embodiments.
Figure 4B:
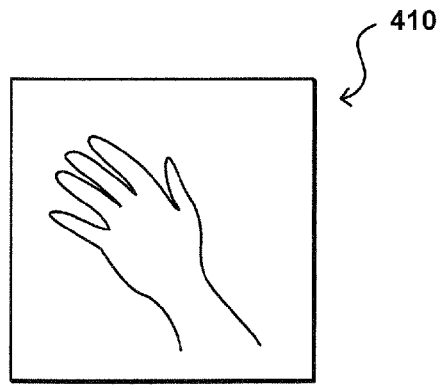
Figure 4C:
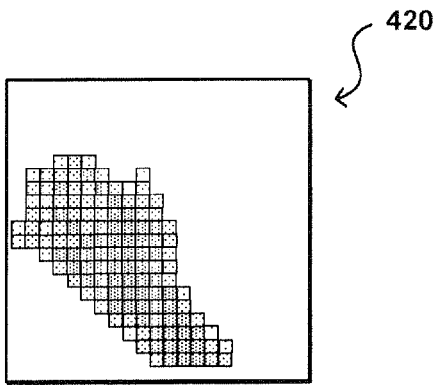
Figure 4D:
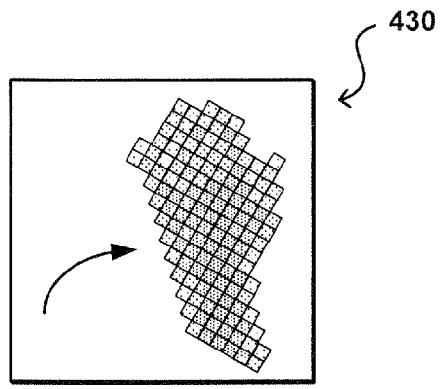

As discussed, the ability to recognize such gestures will not often require high resolution image capture. For example, consider the image 420 illustrated in FIG. 4(c). This image exaggerates the resolution that typically would be utilized, but illustrates the fact that even a very low resolution image can be used to determine gesture input. In FIG. 4(c), the device might not be able to recognize whether the hand is a man's hand or a woman's hand, but can identify the basic shape and location of the hand in the image such that changes in position due to waving or other such motions, as illustrated in image 430 of FIG. 4(d), can quickly be identified with sufficient precision. Even at this low resolution, the device likely would be able to tell whether the user was moving an individual finger or performing another such action.

In at least some embodiments, however, it can be desirable to further reduce the amount of power consumption and/or processing that must be performed by the device. For example, it might be undesirable to have to capture image information continually and/or analyze that information to attempt to determine whether a user is providing gesture input, particularly when there has been no input for at least a minimum period of time.

Accordingly, systems and methods in accordance with various embodiments can utilize a smaller number of pixels on a gesture sensor die or similar element to determine whether to activate the other pixels on the die. For example, a device might require that a user perform a specific gesture to "wake up" the device or otherwise cause the device to prepare for gesture-based input. In at least some embodiments, this "wake up" motion can be a very simple but easily detectable motion, such as waving the user's hand and arm back and forth, or swiping the user's hand from right to left across the user's body. Such simple motions can be relatively easy to detect even in very low resolution images.

For example, consider the low resolution images of FIGS. 5(a) and 5(b). When a user moves a hand and arm from right to left across a sensor, for example, there will be an area of relative light and/or dark that will move across the images. As illustrated, the darker pixels in the image 500 of FIG. 5(a) are shifted to the right in the image 510 of FIG. 5(b). Using only a small number of pixel values, the device can attempt to determine when features such as the darker pixels move back and forth in the low resolution images. Even though such motion might occur due to any of a number of other situations, such as people walking by, the occurrence can be low enough that using such information as an indication that someone might be gesturing to the device can provide a substantial power savings over continual analysis of even a QVGA image.

The low resolution image can be obtained in any of a number of ways. For example, referring back to the gesture sensor 310 of FIG. 3(b), the device can select to utilize a small subset of these pixels, such as 2, 4, 8, or 16 to capture data at a relatively low frame rate (e.g., two frames per second) to attempt to recognize wake up gestures while conserving power. In other embodiments, there can be a set of extra pixels 312 at the corners or otherwise outside the primary area of the gesture sensor. While such an approach could increase the difficulty in manufacturing the sensor in some embodiments, such an arrangement can provide for simplified control and separation of the "wake up" pixels from the main pixels of the gesture sensor. Various other approaches can be used as well, although in many embodiments it will be desirable to disperse the pixels without increasing the size of the die.

The small selection of pixels can capture image data at the lower frame rate at any time when a motion detection mode is operational on the device. The information captured from these pixels in at least some embodiments can be ratioed to detect relative changes over time. In one example, a difference in the ratio between pixels or groups of pixels (i.e., top and bottom, left and right) beyond a certain threshold can be interpreted as a potential signal to "wake up" the device. In at least some embodiments, a wake-up signal can generate a command that is sent to a central processor of the device to take the device out of a mode, such as sleep mode or another low power mode, and in at least some embodiments cause the gesture sensor to switch to a higher frame rate, higher resolution capture mode.

In at least some embodiments, the wake up signal causes the gesture sensor to capture information for at least a minimum period of time at the higher resolution and frame rate to attempt to determine whether the detection corresponded to an actual gesture or produced a false positive, such as may result from someone walking by or putting something on a shelf, etc. If the motion is determined to be a gesture to wake up the device, for example, the device can go into a gesture control mode that can be active until turned off, deactivated, a period of inactivity, etc. If no gesture can be determined, the device might try to locate a gesture for a minimum period of time, such as five or ten seconds, after which the device might go back to "sleep" mode and revert the gesture sensor back to the low frame rate, low resolution mode. The active gesture mode might stay active up to any appropriate period of inactivity, which might vary based upon the current activity. For example, if the user is reading an electronic book and typically only makes gestures upon finishing a page of text, the period might be a minute or two. If the user is playing a game, the period might be a minute or thirty seconds. Various other periods can be appropriate for other activities. In at least some embodiments, the device can learn a user's behavior or patterns, and can adjust the timing of any of these periods accordingly. It should be understood that various other motion detection approaches can be used as well, such as to utilize a traditional motion detector or light sensor, in other various embodiments. The motion detect mode using a small subset of pixel can be an extremely low power mode that can be left on continually in at least some modes or embodiments, without significantly draining the battery. In some embodiments, the power usage of a device can be on the order to microwatts for elements that are on continually, such that an example device can get around twelve to fourteen hours of use or more with a 1,400 milliwatt hour battery.

Another advantage of being able to treat the pixels as having electronic shutters is that there are at least some instances where it can be desirable to separate one or more features, such as a user's hand and/or fingers, from the background. For example, FIG. 6(a) illustrates an example image 600 representing a user's hand in front of a complex background image. Even at various resolutions, it can be relatively processor intensive to attempt to identify a particular feature in the image and follow this through subsequent images. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

In at least some embodiments, a light emitting diode (LED) or other source of illumination can be triggered to produce illumination over a short period of time in which the pixels of the gesture sensor are going to be exposed. With a sufficiently fast virtual shutter, the LED will illuminate a feature close to the device much more than other elements further away, such that a background portion of the image can be substantially dark (or otherwise, depending on the implementation). For example, FIG. 6(b) illustrates an example image 610 wherein an LED or other source of illumination is activated (e.g., flashed or strobed) during a time of image capture of at least one gesture sensor. As can be seen, since the user's hand is relatively close to the device the hand will appear relatively bright in the image. Accordingly, the background images will appear relatively, if not almost entirely, dark. Such an image is much easier to analyze, as the hand has been separated out from the background automatically, and thus can be easier to track through the various images. Further, since the detection time is so short, there will be relatively little power drained by flashing the LED in at least some embodiments, even though the LED itself might be relatively power hungry per unit time. Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

In instances where the ambient light is sufficiently high to register an image, it may be desirable to not illuminate the LEDs and use just the ambient illumination in a low-power ready-state. Even where the ambient light is sufficient, however, it may still be desirable to use the LEDs to assist in segmenting features of interest (e.g., fingers, hand, head, and eyes) from the background. In one embodiment, illumination is provided for every other frame, every third frame, etc., and differences between the illuminated and non-illuminated images can be used to help partition the objects of interest from the background.

As discussed, LED illumination can be controlled at least in part by strobing the LED simultaneously within a global shutter exposure window. The brightness of the LED can be modulated within this exposure window by, for example, controlling the duration and/or the current of the strobe, as long the strobe occurs completely within the shutter interval. This independent control of exposure and illumination can provide a significant benefit to the signal-to-noise ratio, particularly if the ambient-illuminated background is considered "noise" and the LED-illuminated foreground (e.g., fingers, hands, faces, or heads) is considered to be the "signal" portion. A trigger signal for the LED can originate on circuitry that is controlling the timing and/or synchronization of the various image capture elements on the device.

In at least some embodiments, it can be desirable for the gesture sensor, LED trigger, and other such elements to be contained on the chip of the gesture sensor. In at least some embodiments, the gesture sensor is a system-on-chip ("SOC") camera, with the timing signals for the exposure of the pixels and the signal for the LED being generated on-chip. By including various components and functionality on the camera chip, there may be no need in at least certain situations to utilize upstream processors of the device, which can help to save power and conserve resources. For example, certain devices utilize 5-10 milliwatts simply to wake up the bus and communicate with a central processor. By keeping at least part of the functionality on the camera chip, the device can avoid the system bus and thus reduce power consumption.

Various on-die control and image processing functions and circuitry can be provided in various embodiments. In one embodiment, at least some system-level control and image processing functions can be located the same die as the pixels. Such SOC functions enable the sensor and related components to function as a camera without external control circuitry, principally sourcing of clocks to serially read out the data including options for decimation (skipping pixels, or groups of pixels during readout), binning (summing adjacent groups of pixels), windowing (limiting serial readout to a rectangular region of interest), combinations of decimation and windowing, aperture correction (correction of the lens vignetting), and lens correction (correction of the lens geometric distortion, at least the radially symmetric portion). Various other types of functionality can be provided on the camera chip as well in other embodiments.

Figure 7:
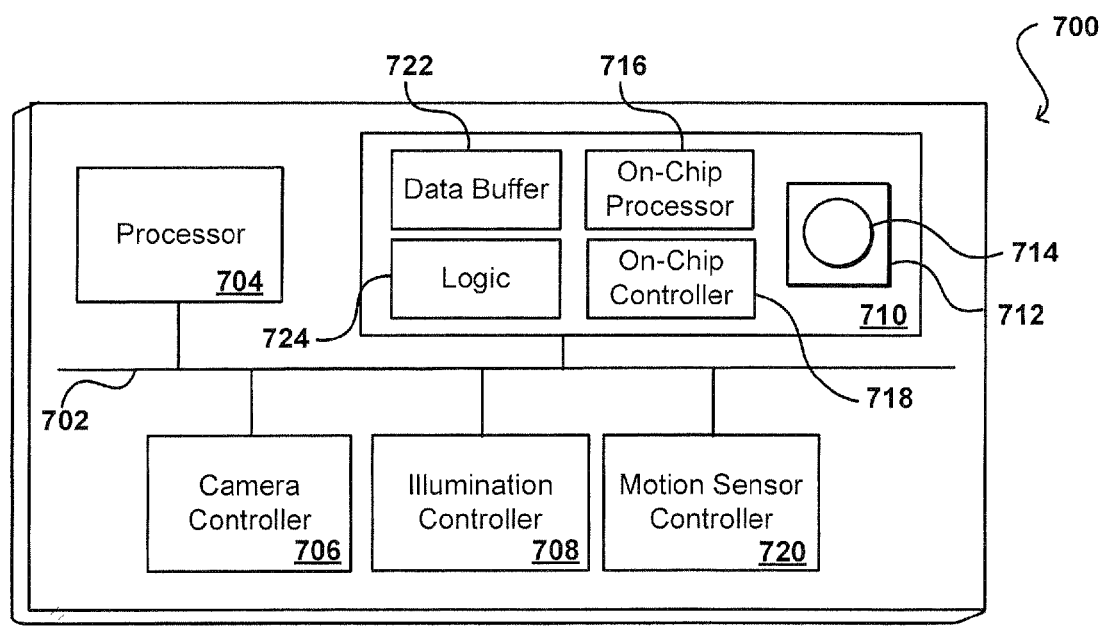
FIG. 7 illustrates a first example configuration of components of a computing device that can be used in accordance with various embodiments.

In one example, FIG. 7 illustrates a configuration 700 wherein at least some processing 716 and controlling 718 components are provided on the chip 710 or sub-assembly with the gesture sensor 712, optical elements 714, and other such components. As discussed, such placement enables certain functionality to be executed without need to access a system bus 702 and/or central processor 704, as well as other such elements. As discussed elsewhere herein, such functionality can also be utilized to control various other components, such as a camera controller 706, illumination controller 708, motion sensor controller 720, or other such element. It should be understood, however, that elements such as the camera controller 706, illumination controller 708, and motion sensor controller 720 can alternatively (or additionally) be located on-chip as well in certain embodiments.

In some embodiments, a companion chip can be utilized for various timing control and image processing functions. Alternatively, functions related to timing generation, strobe control, and some image processing functions can be implemented on a companion chip such as an FPGA or an ASIC. Such an approach permits altering, customizing, or updating functions in the companion chip without affecting the gesture sensor chip.

At least some embodiments can utilize an on-die, low-power wake-up function. In a low power mode, for example, the imager could operate at a predetermined or selected resolution (typically a low resolution such as 4 or 16 or 36 pixels) created by selectively reading pixels in a decimation mode. Optionally, blocks of pixels could be binned for higher sensitivity, each block comprising one of the selected pixels. The imager could operate at a predetermined or selected frame-rate, typically a lower than a video frame rate (30 fps), such as 6 or 3 or 1.5 fps. One reason for operating the imager in low resolution and at low frame rates is to maximally conserve battery power while in an extended standby-aware mode. In such a mode, groups of pixels can be differentially compared, as discussed, and when the differential signal changes by an amount exceeding a certain threshold within a certain time the gesture chip circuitry can trigger a wakeup command, such as by asserting a particular data line high. This line can wake up a "sleeping" central processor which could then take further actions to determine if the wake-up signal constituted valid user input or was a "false alarm." Actions could include, for example, listening and/or putting the cameras into a higher-resolution and/or higher frame-rate mode and examining the images for valid gestures or faces. As discussed elsewhere herein, actions can also include storing at least a portion of the captured image information to a local data buffer 722 and analyzing the captured image information using logic 724 stored by memory on the chip for purposes such as preliminary motion and/or gesture detection. These actions are typically beyond the capability of the on-die processing of conventional cameras. If the input is valid, or otherwise sufficient to trigger one or more actions, functionality on the device can be activated, as may include turning on a display, turning on an LED, entering a particular mode, etc. If the input is determined to be a false alarm, or not determined to be likely to include a gesture or other such information, the central processor can re-enter the sleep state and the cameras can re-enter (or remain in) a standby-aware mode.

If deemed necessary, such as where the overall scene brightness is too low, the on-die camera circuitry can also trigger an LED illuminator to fire within the exposure interval of the camera. In at least some embodiments, the LED can be an infrared (IR) LED to avoid visible flicker that can be distracting to users, as IR LEDs are invisible to people above a certain wavelength. In such an embodiment, the gesture sensor can be operable to detect light at least partially at infrared or near-infrared wavelengths. As discussed later herein, such information can also be used to determine a likely environment of the device, which can be used to determine whether to utilize various on-chip functionality.

Figure 8:
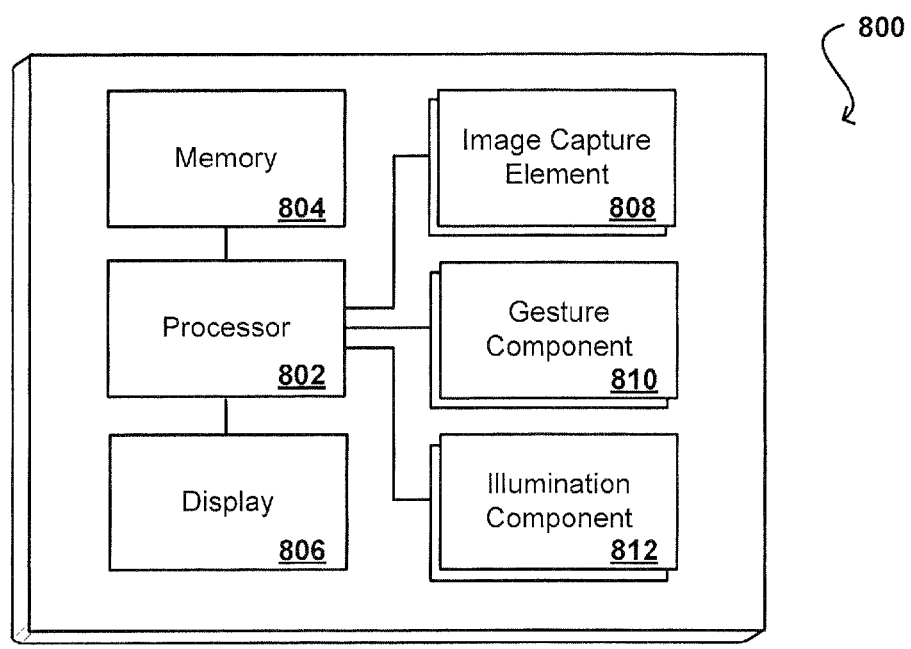
FIG. 8 illustrates a first example configuration of components of a computing device that can be used in accordance with various embodiments.

In order to provide various functionality described herein, FIG. 8 illustrates an example set of basic components of a computing device 800, such as the device 104 described with respect to FIG. 1. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. The device can also include at least one gesture component 810 operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. Gesture sensors also can include various other elements, such as motion sensors, distance detectors, time of flight sensors, and the like. While the example computing device in FIG. 1 includes one image capture element and one gesture sensor on the "front" of the device, it should be understood that such elements could also, or alternatively, be placed on the sides, back, or corners of the device, and that there can be any appropriate number of capture elements of similar or different types for any number of purposes in the various embodiments. Various combinations can also provide for stereo imaging or other types of image capture and/or distance mapping. The device also can include at least one illumination component 812, as may include one or more illumination elements (e.g., LEDs or flash lamps) for providing illumination and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
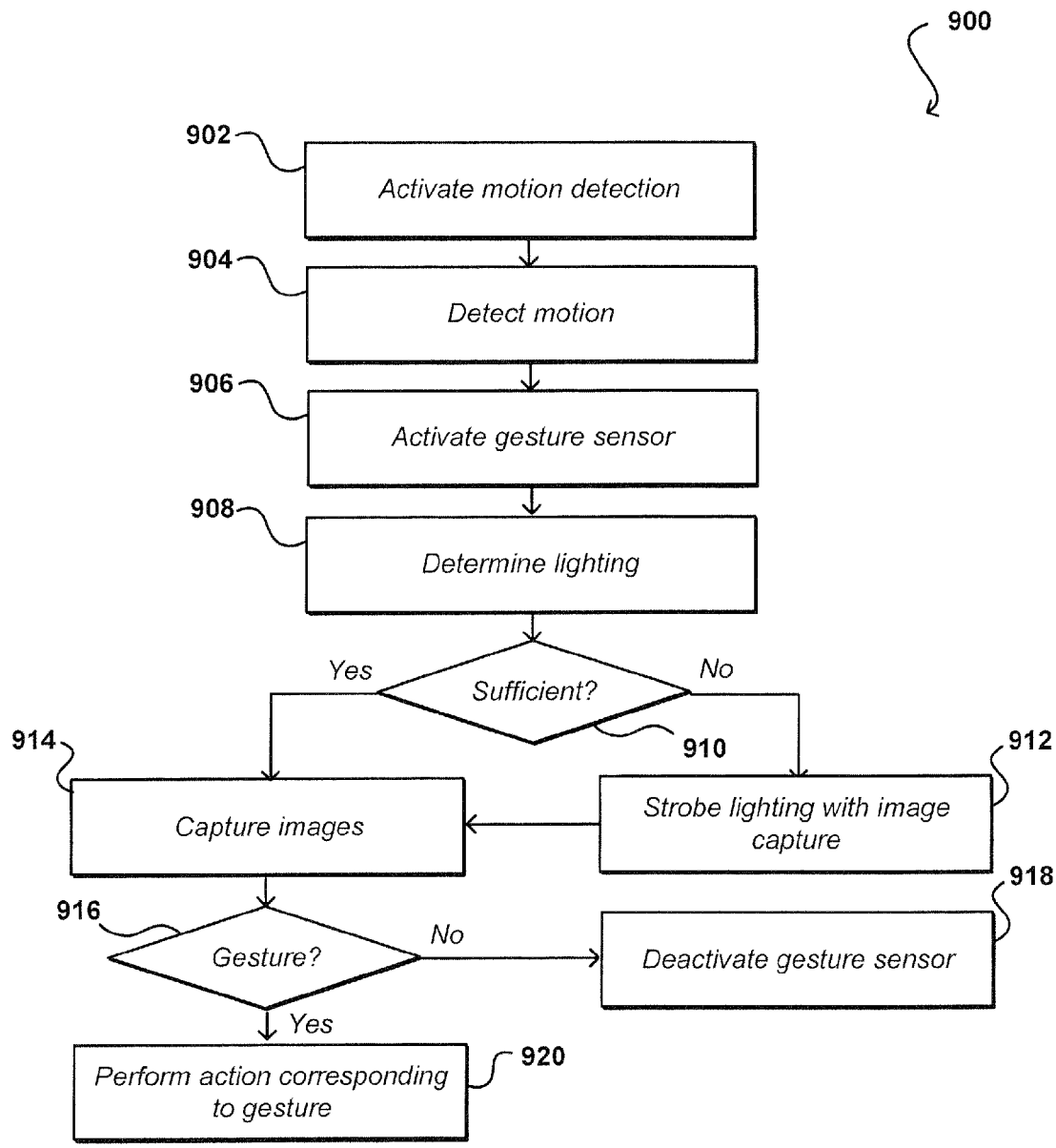
FIG. 9 illustrates an example process for enabling gesture input that can be used in accordance with various embodiments.

FIG. 9 illustrates an example process for enabling gesture input for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a motion detection mode is activated on the computing device 902. In some embodiments, the motion detection mode can automatically be turned on whenever the computing device is active, even in a sleep mode or other such low power state. In other embodiments, the motion detection mode is activated automatically upon running an application or manually upon user selection. Various other activation events can be utilized as well. As discussed elsewhere herein, in at least some embodiments the motion detection is provided by utilizing a small set of pixels of a gesture sensor and using a comparator or similar process to determine various types or patterns of relative motion. When the portion of the gesture sensor detects changes that likely correspond to motion 904, the gesture sensor can be activated for gesture input 906. In embodiments where the motion detection utilizes a subset of the gesture sensor pixels, this can involve activating the remainder of the pixels, adjusting a frame rate, executing different instructions, etc. In at least some embodiments, a detecting of motion causes a signal to be sent to a device processor, which can generate an instruction causing the gesture sensor to go into a higher resolution mode or other such state. Such an embodiment can require more power than an on-chip approach in at least some embodiments, but because the processor takes a minimum amount of time to warm up, such an approach can help to ensure that there is no degradation of image quality when an image is captured that might otherwise occur if the image must wait for the processor to warm up before being processed. When a gesture input mode is activated, a notification can be provided to the user, such as by lighting an LED on the device or displaying a message or icon on a display screen. In at least some embodiments, the device will also attempt to determine an amount of ambient lighting 908, such as by using at least one light sensor or analyzing the intensity of the light information captured by the subset of pixels during motion detection.

If the amount of ambient light (or light from an LCD screen, etc.) is not determined to be sufficient 910, at least one illumination element (e.g., an LED) can be triggered to strobe at times and with periods that substantially correspond with the capture times and windows of the gesture sensor 912. In at least some embodiments, the LED can be triggered by the gesture sensor chip. If the illumination element is triggered or the ambient light is determined to be sufficient, a series of images can be captured using the gesture sensor 914. The images can be analyzed using an image recognition or gesture analysis algorithm, for example, to determine whether the motion corresponds to a recognizable gesture 916. If not, the device can deactivate the gesture input mode and gesture sensor and return to a low power and/or motion detection mode 918. If the motion does correspond to a gesture, an action or input corresponding to that gesture can be determined and utilized accordingly. In one example, the gesture can cause a camera element of the device to be activated for a process such as facial recognition, where that camera has a similar form factor to that of the gesture sensor, but a higher resolution and various other differing aspects. In some embodiments, the image information captured by the gesture sensor is passed to a system processor for processing when the gesture sensor is in full gesture mode, with the image information being analyzed by the system processor. In such an embodiment, only the motion information is analyzed on the camera chip. Various other approaches can be used as well as discussed or suggested elsewhere herein.

In at least some embodiments, a gesture sensor can have a wider field of view (e.g., 120 degrees) than a high resolution camera element (e.g., 60 degrees). In such an environment, the gesture sensor can be used to track a user who has been identified by image recognition but moves outside the field of view of the high resolution camera (but remains within the field of view of the gesture sensor). Thus, when a user re-enters the field of view of the camera element there is no need to perform another facial recognition, which can conserve resources on the device.

Various embodiments also can control the shutter speed for various conditions. In some embodiments, the gesture sensor might have only have one effective "shutter" speed, such as may be on the order of about one millisecond in order to effectively freeze the motion in the frame. In at least some embodiments, however, the device might be able to throttle or otherwise adjust the shutter speed, such as to provide a range of exposures under various ambient light conditions. In one example, the effective shutter speed might be adjusted to 0.1 milliseconds in bright daylight to enable to the sensor to capture a quality image. As the amount of light decreases, such as when the device is taken inside, the shutter might be adjusted to around a millisecond or more. There might be a limit on the shutter speed to prevent defects in the images, such as blur due to prolonged exposure. If the shutter cannot be further extended, illumination or other approaches can be used as appropriate. In some embodiments, an auto-exposure loop can run local to the camera chip, and can adjust the shutter speed and/or trigger an LED or other such element as necessary. In cases where an LED, flash lamp, or other such element is fired to separate the foreground from the background, the shutter speed can be reduced accordingly. If there are multiple LEDs, such as one for a camera and one for a gesture sensor, each can be triggered separately as appropriate.

Figure 10A:
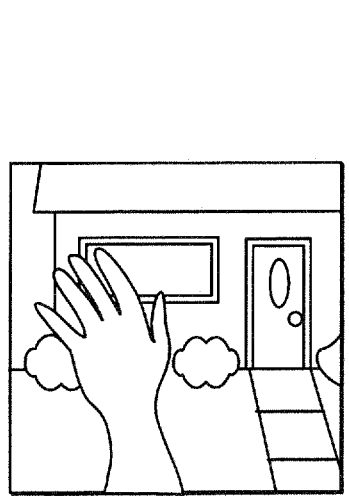
FIGS. 10(a) and 10(b) illustrate a difference in relative motion between a moving foreground feature and other objects in image information that can be analyzed in accordance with various embodiments.
Figure 10B:
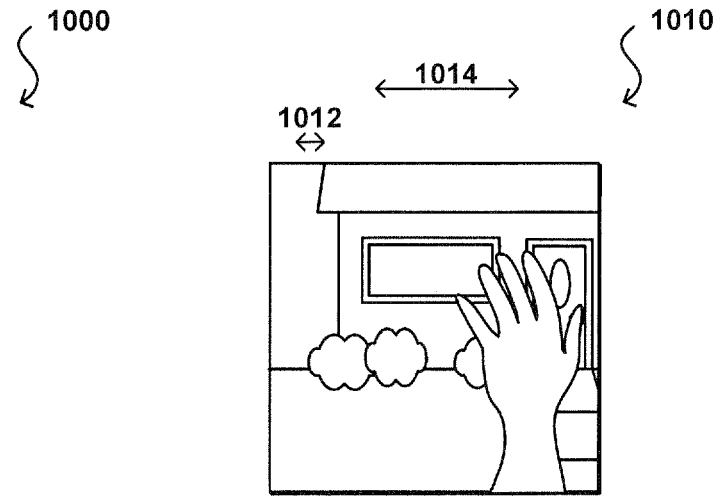

In some embodiments, a gesture sensor assembly can be used to attempt to detect motion of foreground objects by determining a relative speed or rate of movement of one or more objects in the captured image information. For example, FIG. 10(a) illustrates an example image 1000 captured at a first time and FIG. 10(b) illustrates an image 1010 captured at a second time. As illustrated, there is at least a slight amount of movement of all the objects between images. The objects in the background move by a relatively small amount 1012, and the object in the foreground (the hand in this example) moves by a much larger amount 1014. As should be understood to one of ordinary skill in the art, movement of an object close to a camera will appear to change position in the captured image information much faster than objects in the background. Further, gestures performed by a user will typically be relatively fast motions, as a "wave to wake" or similar motion can take only a fraction of a second to pass to the edges of the field of view of the camera and back. Thus, objects or features performing gestures will likely have a minimum speed with respect to other objects in the captured image information.

Approaches in accordance with various embodiments can look to the relative amount of movement of an object over a period of time of video capture, or between images captured at different times, to attempt to locate objects that move with at least a minimum amount or threshold amount of speed, for example, such that the device should register that motion as a potential wake up gesture. For example, if the motion of the hand between FIGS. 10(a) and 10(b) occurs over a period of time such that the speed is less than the threshold, the device might determine that the motion is due to motion of the device, and might not treat the movement as a potential gesture. If, however, the amount of motion occurs over a relatively short period of time such that the speed is determined to likely correspond to a gesture, the device can take an appropriate action such as to activate high resolution image capture and/or activate a device processor to attempt to recognize a particular gesture. The threshold amount of motion or speed can be any appropriate value, such as an amount or fraction of the field of view of the gesture sensor over a period of time (e.g., at least a quarter of the field of view within a tenth of a second) or an amount of movement that corresponds to such a rate. A minimum amount of movement might be required to ensure that the motion is not due to noise or other such causes. In situations where distance information is also available, such as through stereo imaging or by using a distance sensor, for example, the actual speed of an object can be determined, which can be compared to a specific speed threshold or other such value.

In at least some embodiments, an amount of motion of the device can also be used to increase the accuracy of gesture determinations. For example, if the amount of translation and/or rotation of the device is determined, this amount of movement can be accounted for in the image information as discussed elsewhere herein. If device-related movement is effectively removed, any remaining movement in the images will correspond primarily to objects that actually moved during that period of time. By determining the relative speeds of each of these motions without device movement effects, the device can more accurately determine when motion of an object in the image information corresponds to a gesture or other such movement.

Figure 11A:
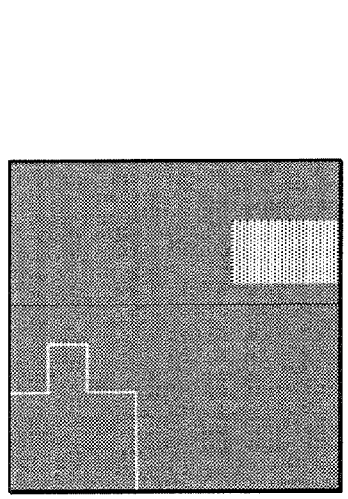
FIGS. 11(a) and 11(b) illustrate different images captured while providing illumination that can be analyzed in accordance with various embodiments.
Figure 11B:
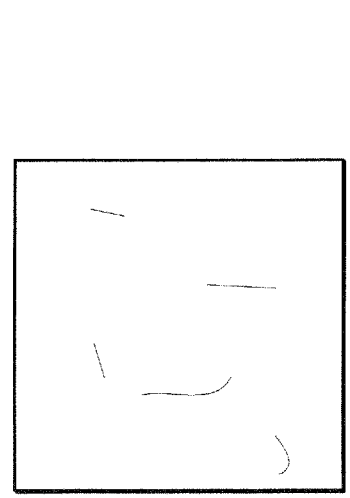

In some embodiments, a device might further attempt to conserve resources by first determining if the device is in an environment, such as a pocket or backpack, where motion detection should not be activated. For example, as discussed above a sensor assembly or subsystem can have the ability to activate illumination elements and cameras, among other such elements. If a device captures image information or uses a light sensor to indicate that the device is in a dark area, the device can attempt to determine whether the device is in a dark room or outdoors at night, for example, or whether the device is in a type of enclosure that would prevent the device from being able to view and/or detect gestures. In at least some embodiments, such an assembly can flash an illumination element and analyze an image captured during the flash. In situations where the device is in an environment such as a dark room or outdoors, the light flash will result in an image that will either be relatively dark, as illustrated in the example image 1100 of FIG. 11(*a*), or will show objects in the image information as illustrated in FIG. 10(*b*), for example. If the device is in an enclosure such as a pocket or bag, however, an image captured during a flash can appear overexposed, or at least very bright, as illustrated in the example image 1110 of FIG. 11(*b*), as the illumination will be quickly and substantially reflected by a very close surface. In at least some embodiments, a device that determines it is in a dark environment but that has an intensity of captured image information (during an illumination period) that exceeds a brightness threshold or other such value can prevent a motion detection process or other such functionality from activating on the device, in order to conserve resources.

In various embodiments, the illumination can be visible light or infrared (IR) radiation. An advantage to using an IR source is that the radiation will not be visible by a user so as to be distracting. Frequently flashing such a source can be a significant drain on power, however, such that a device in accordance with at least some embodiments can flash or perform such determinations only upon a determined change in state of the device. For example, a device might detect that the device has been moved, is being contacted, is in an area of changing brightness, etc. In response to some or any of these actions, the device might attempt to determine its environment. If the sub-assembly (or other such component) determines that the device is in a pocket, the device might not make another determination until such a change is detected. In some embodiments, a device might make a determination at regular intervals, such as every five minutes, to attempt to determine a change in state, such as where an object had previously been covering the device but had been moved, etc. Various other approaches can be used as well as should be apparent in light of the teachings and suggestions contained herein.

Further, as discussed previously an illumination element such as a light emitting diode (LED) can also be triggered to produce illumination over a short period of time in which an image capture element is going to be capturing image information for gesture detection or other such process. The LED in many instances will illuminate a feature relatively close to the device much more than other elements further away, such that a background portion of the image can be substantially dark (or otherwise, depending on the implementation). For example, FIG. 12(*a*) illustrates a first example image 1200 captured using ambient light and FIG. 12(*b*) illustrates a second example image 1210 captured while an LED or other source of illumination is activated (e.g., flashed or strobed) during (or immediately prior to) a time of image capture. As can be seen, the user's hand 1202 changes in appearance between the two images due at least in part to the proximity of the user's hand to the illumination element of the device. As illustrated in FIG. 12(*b*), the user's hand appears significantly brighter in the second image 1210. Objects in the background might not change significantly as a result of the illumination.

Since the background portions of the images do not substantially change between images, those sections can be at least partially removed from the images by performing a comparison of the two images. For example, FIG. 12(*c*) illustrates an example image 1220 that can be generated by performing a subtraction of the color and/or intensity values of the pixel locations of the first image 1200 and the color and/or intensity values of the pixel locations of the second image 1210. Such an image comparison can separate out the hand in the generated example image 1220, as the illumination projected from the device at the time of capture of the second image can cause the hand to substantially change color and intensity values in the second image (e.g., appear white). The hand then appears prominently in the resulting image due to the large differences in color and intensity values between the two images. Since there is no motion and very little intensity or color change of the background portion of the images, performing a pixel-by-pixel value subtraction (or other such comparison approach) result in the background portions having a very low color value and/or intensity. In some embodiments, the color values might be near zero, resulting in a near black or white background in at least some situations. Due to variations, auto focus, slight movements, and other such factors, there still might be at least some of the background portion visible in the image 1220 resulting from the comparison. As should be understood, the result of a comparison process does not have to involve the creation of a separate image in at least some embodiments.

As illustrated in FIG. 12(*c*), however, the changes in the color, intensity, brightness, and/or other such values of objects near to the device, such as the user's hand in this example, cause those objects to appear more prominently in the resulting image 1220. For example, a user's hand might go from a flesh color to an almost white color, having substantially different color values (e.g., R, G, B), such that subtracting the color values for corresponding pixels between the two images will result in substantially non-zero color values in the image resulting from the subtraction. Although subtraction is mentioned by way of example, various other image comparison processes and algorithms can be used as well within the scope of the various embodiments, which can take advantage of the separation of foreground and background objects through image comparison.

As mentioned above, however, such processes typically rely on the fact that objects in the background will remain relatively stationary with respect to the camera of the computing device between image captures. Consider the situation, however, where a user unintentionally rotates the device between image captures, such as may be due to the user walking, shivering, riding in a vehicle, or experiencing another such motion. FIG. 12(*d*) illustrates an example of an image 1230 captured after a rotation of the computing device (e.g., a rotation of the device about an axis running up and down through the device—such a rotation often referred to as a yaw motion). As can be seen, relative to FIG. 12(*a*), the user's hand 1202 has changed position as a result of the rotation of the computing device. As also can be seen, however, the objects in the background, such as the house 1232, have changed position as well. This change in position can negatively impact the subtraction or comparison process because corresponding pixels of the compared images may not correspond to the same object or portion of the same object. FIG. 12(*e*) illustrates an example of a resultant image 1240 when combining the first image 1200 and the image 1230 captured after device rotation. As illustrated in the resulting image 1230, the subtraction has not significantly removed the background, as the objects in the background are no longer aligned in the images. In fact, the resulting image now might be more difficult to analyze and/or attempt to recognize objects in the foreground. Thus, it can be desirable to implement an approach to counter-acting or at least accounting for, the motion of the device between image captures.

Figure 12A:
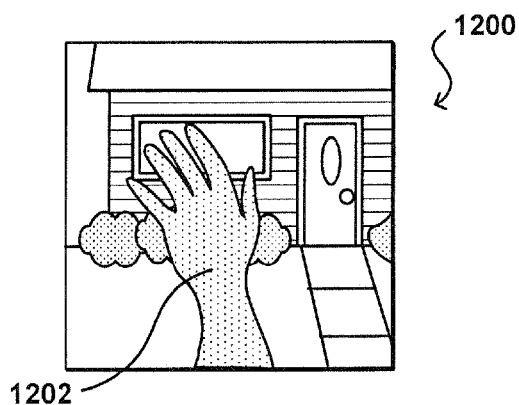
FIGS. 12(a), 12(b), 12(c), 12(d), and 12(e) illustrate examples of images that can be used and/or generated using an image comparison or subtraction process in accordance with various embodiments.
Figure 12B:
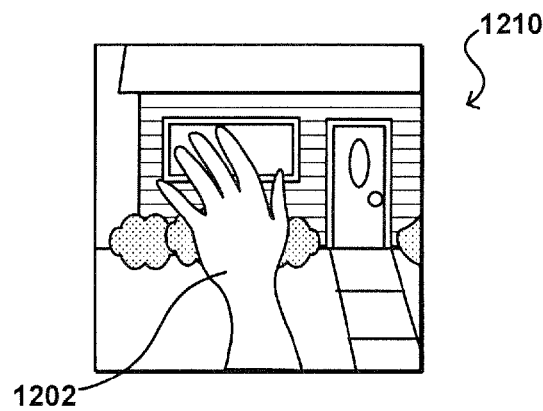
Figure 12C:
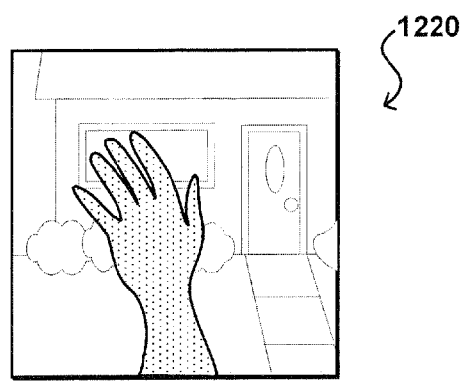
Figure 12D:
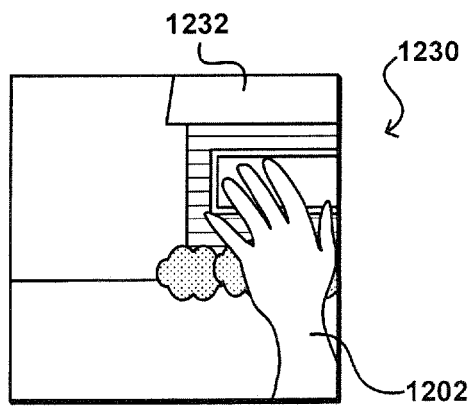
Figure 12E:
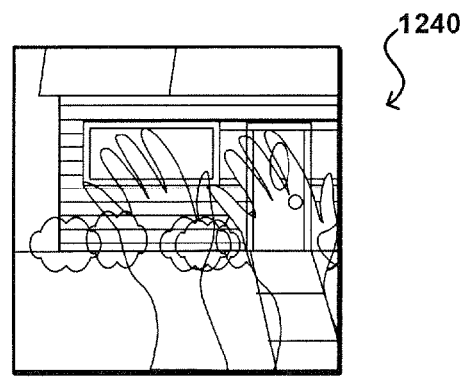
Figure 13A:
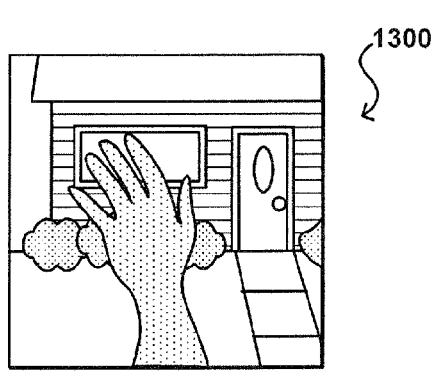
FIGS. 13(a) and 13(b) illustrate example images resulting from a translation of a device between image capture times that can be analyzed in accordance with various embodiments.
Figure 13B:
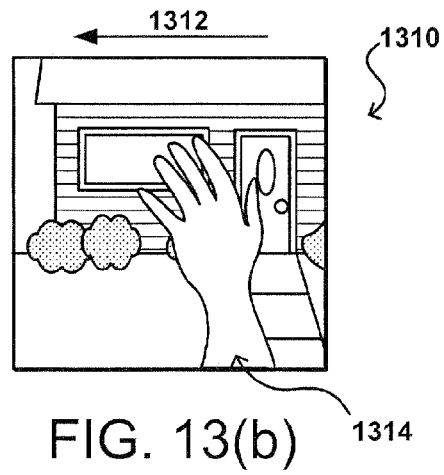

As would be apparent to one of ordinary skill in the art in light of the present disclosure, the motion of a camera or other such imaging element can include both a translation and a rotation component, in one, two, or three dimensions. As illustrated in FIG. 12(e), small rotations of a camera can potentially result in significant movement of objects in the captured images. The amount of movement can depend upon the angular capture range, or viewable angle, of the camera, as well as the speed of the rotation. Because all objects in the image will move by the same angular amount, the background moves with the objects in the foreground in the image information. It should be noted, however, that translation tends not to affect the background to the same extent between images. For example, FIG. 13(a) illustrates a first image 1300 captured at a first position and FIG. 13(b) illustrates a second image 1310 captured at a second position, resulting from a lateral translation as indicated by the directional arrow 1312. Due at least in part to the distance to the background objects, which for small consumer optical components can be considered to be almost at infinity for calculation purposes, there will be very little lateral shift in position of the background objects between pictures. Objects in the foreground, such as the user's hand 1314, however, can move by a more appreciable amount. Thus, comparing the images 1300, 1310 can still provide adequate separation of the background (e.g., by image subtraction) as the small change in lateral position of the background will still enable the background to be substantially removed during the comparison process.

Accordingly, approaches in accordance with various embodiments focus primarily on rotations of the phone when accounting for device movements between image captures. In other embodiments as discussed, however, at least some embodiments can also account for at least some amount of translation when present.

Figure 14A:
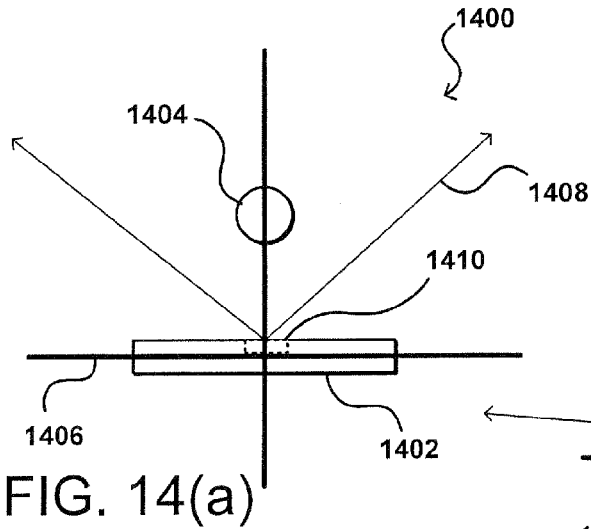
FIGS. 14(a), 14(b), and 14(c) illustrate an example situation wherein the rotation of a device can be tracked and used to align images based at least in part upon the rotation in accordance with various embodiments.

For example, FIG. 14(a) illustrates a "top view" 1400 of a computing device 1402 operable to capture an image of an object 1404 within an angular view 1408 of a camera of the computing device. In this example, the computing device 1402 can include at least one orientation- or rotation-determining element, such as an electronic compass or electronic gyroscope, that is able to determine a frame of reference 1406 in two or three dimensions with respect to a first orientation of the device. In at least some embodiments, an electronic compass might be used to determine an axis of the frame of reference 1406, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1406 or orientation can be determined at or near the time of capture of a first image by a camera 1410 of the computing device 1402. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 14B:
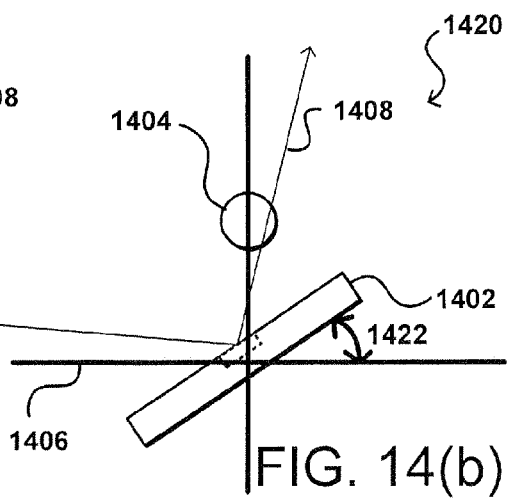

FIG. 14(b) illustrates a second top view 1410 after a change in orientation of the computing device 1402. The electronic gyroscope (or other such component or embedded sensor) can detect the change in orientation, in this example corresponding to a change in angle 1412 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1412 about a single axis. As illustrated, this causes the object 1404 to be moved to the right edge of the field of view 1408 of the camera 1410. In at least some embodiments, the gyroscope will not be accurate enough to provide an exact amount of rotation, but can provide an approximation or estimate of the amount of rotation that can be used to narrow the search space and facilitate the location of corresponding objects in the images.

Figure 14C:
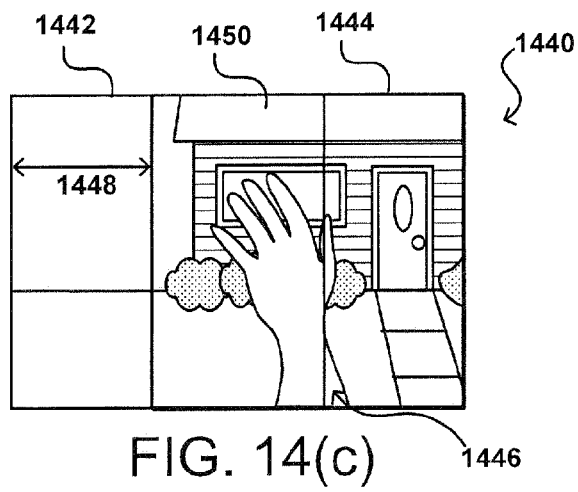

As mentioned above, the amount of angular motion can be utilized with information about the angular capture range of the camera to determine or predict how much lateral offset will be experienced between the images. For example, the angular capture range or field of view 1408 of the camera 1410 in FIG. 14(b) might be 120 degrees, and the angular rotation amount might be 40 degrees. Since the angular movement is about one third of the total angular view, the objects will likely move laterally, according to the direction of the rotation, about one third of the width of each image between successive images (although this is an approximation and can vary depending upon aspects of the optics, etc.). Based at least in part upon the amount of lateral movement, the images taken at those times can be aligned such that corresponding objects in those images will overlap. For example, FIG. 14(c) illustrates an example overlay 1420 of a first image 1422 captured at a first orientation of the computing device and a second image 1424 captured at a second orientation of the computing device. Once an amount of lateral shift in object location between the images is determined, that amount of lateral shift or offset 1428 can be used to align the images 1422, 1424 such that objects 1430 in the background will substantially align as well. As discussed elsewhere herein, the images do not have to be aligned by modifying at least one of the images to adjust for object shift, but image information such as color and intensity data can be mapped from one of the images to the appropriate positions of the corresponding image information in the other image, enabling a pixel-by-pixel or position-by-position comparison. Once the background objects are aligned, a comparison or subtraction process can be used to remove the background such that one or more objects 1426 in the foreground can be more easily detected, as discussed elsewhere herein.

As mentioned, a combined or aligned image such as that illustrated in FIG. 14(c) does not need to be generated in at least some embodiments. For example, pixel values can be offset by an appropriate amount, such as by shifting pixel values by a determined amount for the change in position, and then comparing the individual values to remove background objects, static portions of the image, etc. Various other comparison approaches can be used as well within the scope of the various embodiments.

In at least some embodiments, the on-chip logic can activate and monitor movement of the device during gesture monitoring and attempt to use this information to separate objects in the foreground for purposes or motion and/or gesture detection. As discussed, an assembly can look for motion of a foreground object independent of the motion of the device, and attempt to determine whether this motion corresponds to a pattern of a wakeup gesture or other such motion. In at least some embodiments, this action must have at least a minimum speed, as discussed above, in order to be interpreted as such a gesture.

Figure 15:
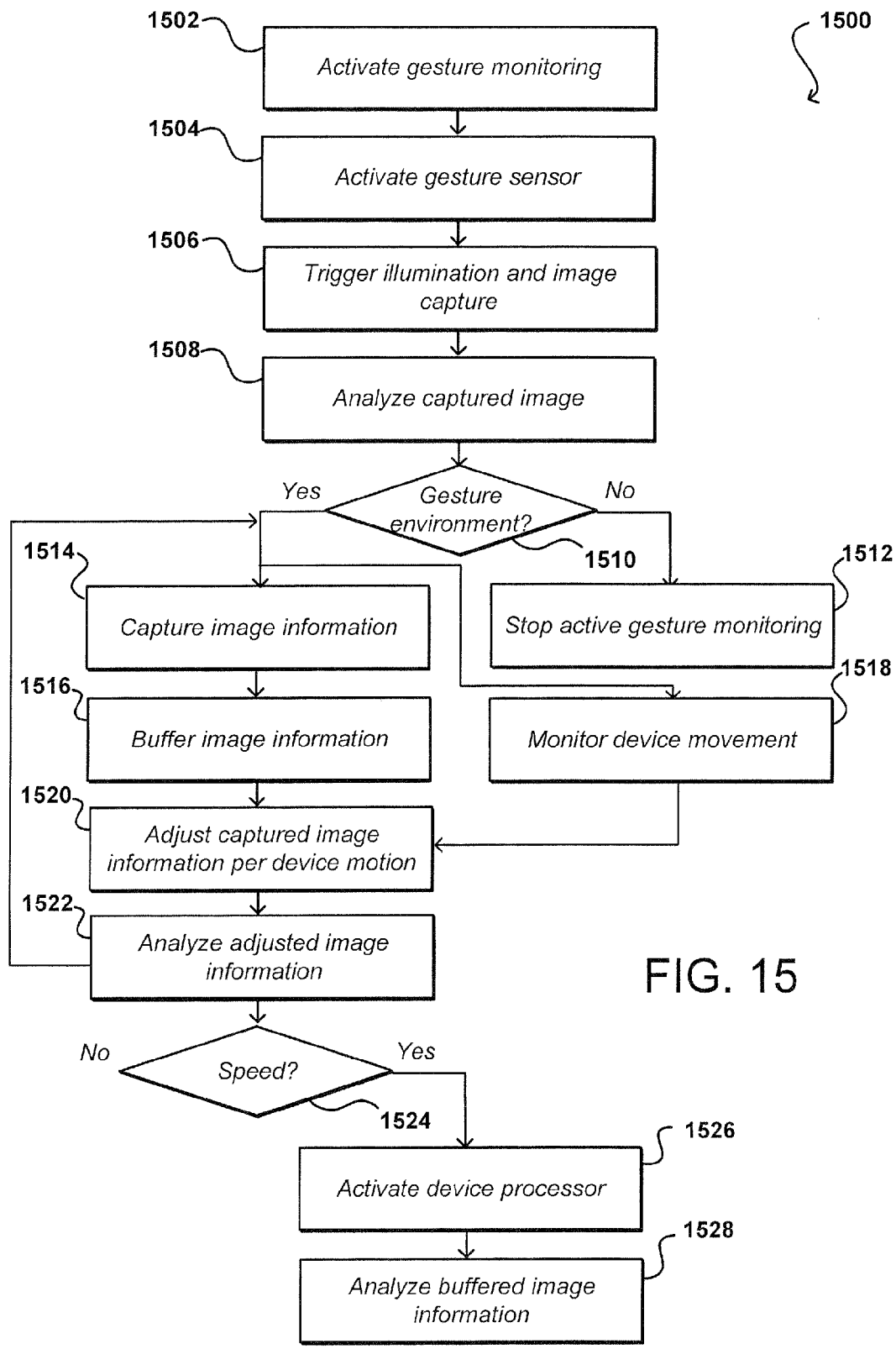
FIG. 15 illustrates an example process for monitoring various device inputs for gesture determination that can be used in accordance with various embodiments.

In some embodiments, a device might utilize a process where various stages are used to determine when to wake up various functionality on a device. FIG. 15 illustrates one such process 1500 that can be utilized in accordance with various embodiments. It should be understood that the various stages discussed can be used separately or in different combinations, etc. In this example process, gesture monitoring is activated 1502 on a computing device. As discussed above, the monitoring can be activated using any appropriate manual or automatic process in response to any appropriate action. In this example, a sensor or gesture sub-assembly of the device is activated 1504 independent of whether a main processor of the device is active. The sub-assembly can trigger 1506 light to be emitted from the device and at least one image or portion of video to be captured, which can be analyzed 1508 to attempt to determine whether the device is in an environment appropriate for gesture detection. If the device is determined 1510 not to be in such an environment, such as where the device is in a pocket, then gesture monitoring can be deactivated or placed in a low activity state 1512 as discussed herein. As discussed, such determination can be made using a local processor and logic of the gesture sub-assembly, or other such components.

If the device is determined to be in an appropriate environment, the sub-assembly can cause image information to be captured 1514 using at least one camera or gesture sensor of the device. As discussed, the camera or sensor can be part of the sub-assembly, and can be run at a lower resolution or with a fewer number of pixels than when in other modes. In other embodiments, one or more cameras or sensors (e.g., IR detectors or time-of-flight detectors) might be activated that are not part of the sub-assembly, which can be capable of any appropriate type of image capture, such as three-dimensional imaging, higher resolution imaging, etc. Further, a camera in at least some embodiments can be run in any appropriate mode, such as a low color or grayscale mode, to further attempt to conserve resources on the device. In at least some embodiments, the sub-assembly can also buffer 1516 an amount of image data, such as the last few images or a period of video information, for use in subsequent analysis. In this example, the sub-assembly can also trigger device motion monitoring 1518 on the computing device. The motion determinations can be made during image capture in at least some embodiments. As discussed, this can include activating one or more motion determining elements, such as a gyroscope, inertial sensor, compass, or accelerometer, for example, and monitoring movement or motion of the device over time. The motion information can be used to account 1520 for device motion effects in the captured image information, such as by adjusting the captured image information, in order to help reduce the likelihood of false positives in the motion or gesture determination process.

The image information after removal of any device motion effects can be analyzed 1522 to attempt to locate one or more foreground objects that are moving in the image information relative to the device. As discussed, in order to minimize resource usage the process might not attempt to recognize or verify a type of object or feature providing the motion, but might instead look for an amount or speed of motion of a foreground object. A processor of the sub-assembly can attempt to determine 1524 whether any objects in the image information are moving with at least a gesture threshold amount of speed. If no foreground object has at least the threshold amount of speed, the sub-assembly can continue in the current state to attempt to locate gestures or motion. If, on the other hand, at least one foreground object is located with at least that amount of speed, the sub-assembly can trigger a main device processor to be activated 1526, and can cause the processor to analyze 1528 the buffered data and/or any more recently captured data to attempt to locate one or more gestures in the image information. Upon locating a gesture, the device processor can take any appropriate action. For example, if a wave to wake gesture is detected to be performed by a user's hand, the device processor can cause various functionality to be activated on the device, such as by starting certain applications, activating image capture using full color and resolution of the gesture sensor or another camera on the device, etc.

Figure 16:
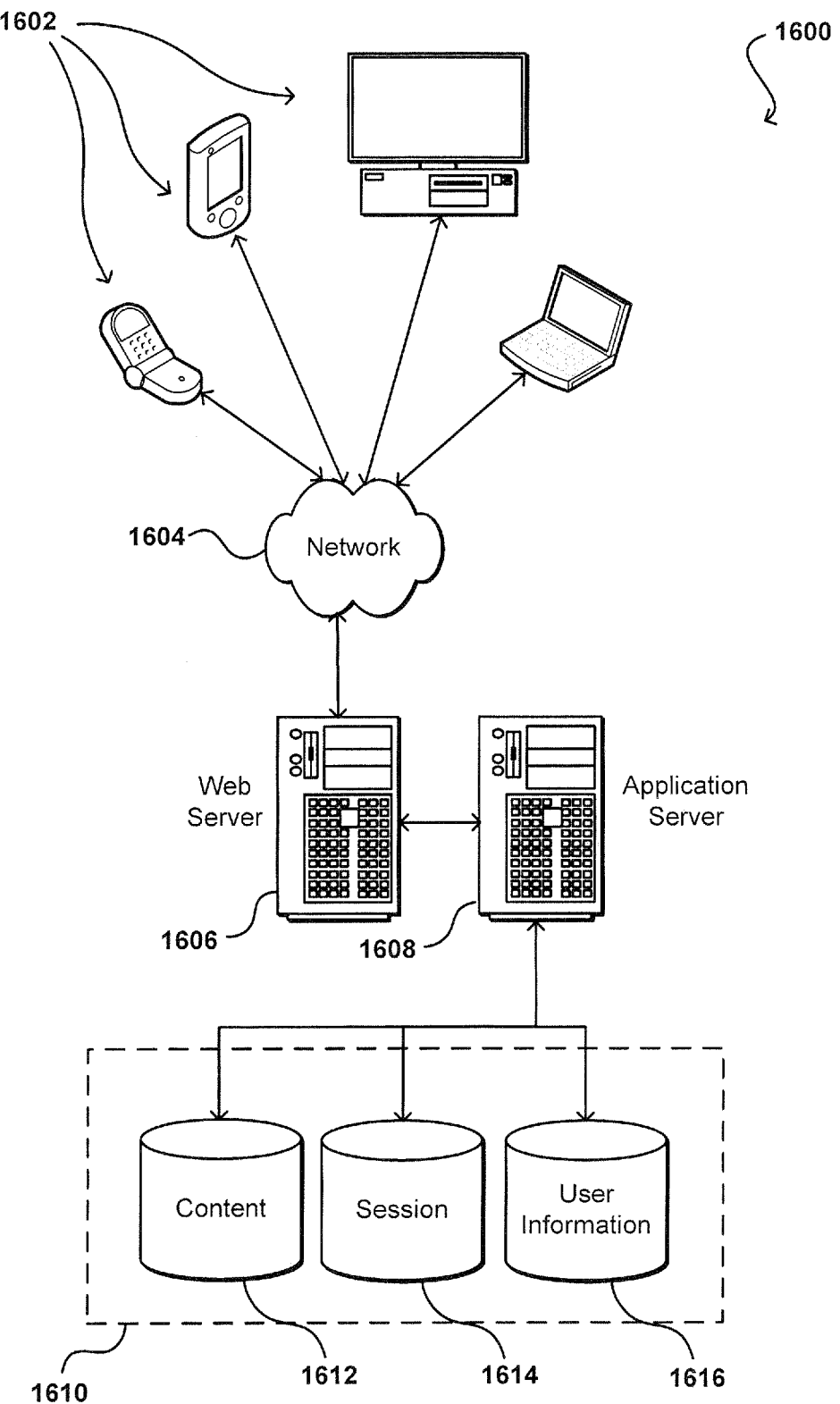
FIG. 16 illustrates an example environment in which various embodiments can be implemented.

As discussed, different approaches can be implemented in various environments in accordance with the described embodiments. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The system includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1606 for receiving requests and serving content in response thereto, although for other networks, an alternative device serving a similar purpose could be used, as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1606 in the form of HTML, XML or another appropriate structured language in this example. The handling of all requests and responses, as well as the delivery of content between the client device 1602 and the application server 1608, can be handled by the Web server 1606. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing content (e.g., production data) 1612 and user information 1616, which can be used to serve content for the production side. The data store is also shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a device processor;
a motion-determining sensor;
a gesture subsystem including at least a second processor and a camera; and
memory including instructions that, when executed by the second processor, cause the second processor to:
    acquire a first image and a second image of an object using the camera, the first image being captured at a first time and the second image being captured at a second time;
    determine, using information generated by the motion-determining sensor, motion of the computing device between the first and second times;
    process image information of at least one of the first image or the second image to account for a difference in a position of the object, in the acquired image information, due to the motion of the computing device between the first and second times to generate processed image information;
    determine a speed of motion of the object between the first and second times using the processed image information;
    determine that the speed of motion of the object at least meets a gesture speed threshold;
    activate, via the second processor, the device processor, the device processor being configured to analyze the processed image information; and
    activate a second camera, the second camera being positioned a distance from the gesture subsystem and being configured to capture additional image information.

2. The computing device of claim 1, further comprising:
an illumination element, the second processor being further operable to cause the camera to capture an image during activation of the illumination element.

3. The computing device of claim 1, wherein the first image and the second image are frames of video content.

4. The computing device of claim 1, wherein the gesture subsystem is further configured to store image data captured by the camera, the second processor configured to analyze the stored image data to attempt to recognize a gesture performed by the object.

5. The computing device of claim 1, wherein the instructions, when executed by the second processor, further cause the second processor to:
    capture, by the second camera, a third image of the object when the second camera is activated.

6. A computer-implemented method, comprising:
capturing image information using a first camera of a computing device;
analyzing, using a first processor associated with the first camera, the captured image information to determine a speed of movement of an object;
triggering, using the first processor, activation of a device processor of the computing device when the determined speed of movement of the object at least meets a gesture speed threshold, the device processor being positioned a distance from the first processor and configured to recognize a gesture performed by the object with respect to the computing device; and
activating, using the first processor, a second camera, the second camera being positioned a distance from the first camera, the second camera being configured to capture additional image information.

7. The computer-implemented method of claim 6, further comprising:
triggering, using the first processor, at least one sensor of the computing device; and
measuring, using the at least one sensor, an amount of movement of the computing device during the capturing of the image information.

8. The computer-implemented method of claim 7, further comprising:
modifying the captured image information to adjust a change in position of the object in the captured image information due to motion of the computing device.

9. The computer-implemented method of claim 7, wherein the at least one sensor includes at least one of an accelerometer, an inertial sensor, an electronic compass, or an electronic gyroscope.

10. The computer-implemented method of claim 6, further comprising:
activating, using the first processor, a second camera in response to the determined speed of movement of the object at least meeting the gesture speed threshold, the second camera configured to capture image information of the object for use by the device processor in recognizing a gesture, the second camera having a higher resolution than the first camera.

11. The computer-implemented method of claim 10, wherein the second camera is capable of capturing image information without the device processor being activated.

12. The computer-implemented method of claim 11, wherein the image information captured by the second camera is capable of being stored for analysis by at least one of the first processor or the device processor.

13. The computer-implemented method of claim 6, further comprising:
triggering, using the first processor, an illumination element to produce illumination;
capturing, using the first camera, an image during illumination by the illumination element; and
analyzing the captured image to determine whether the computing device is in an environment where a gesture performed by a user is able to be detected.

14. The computer-implemented method of claim 13, wherein analyzing the captured image information to determine a speed of movement of an object in the captured image information occurs only when the computing device is determined to be in an environment where a gesture performed by a user is able to be detected.

15. The computer-implemented method of claim 6, further comprising:
adjusting a capture mode of the first camera when the determined speed of movement of the object at least meets a gesture speed threshold.

16. A computer-implemented method, comprising:
capturing image information using a first sensor of a computing device;
triggering, using a first processor associated with the first sensor, at least one second sensor of the computing device;
measuring, using the at least one second sensor, an amount of movement of the computing device during the capturing of the image information;
modifying the captured image information to correct for an apparent amount motion of an object in the image information due to motion of the computing device;
analyzing, using the first processor, the modified image information to determine movement of the object relative to the computing device;
triggering, using the first processor, activation of a device processor of the computing device when the movement of the object is indicative of a gesture performed by a user, the device processor being positioned a distance from the first processor; and
activating, using the first processor, a second camera, the second camera being positioned a distance from the first sensor, the second camera being configured to capture additional image information.

17. The computer-implemented method of claim 16, wherein the movement of the object is indicative of a gesture performed by a user when a determined speed of movement of the object at least meets a gesture threshold.

18. The computer-implemented method of claim 16, wherein the at least one second sensor includes at least one of an accelerometer, an inertial sensor, an electronic compass, or an electronic gyroscope.

19. The computer-implemented method of claim 16, wherein the image information captured by the first sensor is capable of being stored for analysis by at least one of the first processor or the device processor.

20. The computer-implemented method of claim 16, further comprising:
triggering, using the first processor, an illumination element to produce illumination;
capturing, using the first sensor, an image during illumination by the illumination element; and
analyzing the captured image to determine whether the computing device is in an environment where a gesture performed by a user is able to be detected.

21. A non-transitory computer-readable storage medium storing instructions for controlling an electronic device, the instructions when executed by at least one processor causing the electronic device to:
capture image information of an object using a first camera;
determine, using information generated by at least one embedded sensor of the electronic device, motion of the computing device during the capturing of image information by the first camera;
process, by the at least one processor, the captured image information to account for a change in an apparent position of the object in the image information due to motion of the computing device;
determine, by the at least one processor, a speed of motion of the at least one object using the processed image information;
determine that the motion of the at least one object at least meets a speed threshold;
activate a device processor the device processor being configured to analyze the processed image information; and
activate a second camera, the second camera being positioned a distance from the first camera, the second camera being configured to capture additional image information.

22. The non-transitory computer-readable storage medium of claim 21, wherein the instructions when executed further cause the electronic device to:
cause the first camera to capture an image during activation of an illumination element to determine whether the electronic device is in an enclosed environment where image information is unable to be captured for the object.

23. The non-transitory computer-readable storage medium of claim 21, wherein the instructions when executed further cause the electronic device to:
activate a second camera when the speed of motion of the object at least meets the gesture speed threshold.

24. The non-transitory computer-readable storage medium of claim 21, wherein the instructions when executed further cause the electronic device to:
store image data captured by the first camera, the device processor configured to analyze the stored image data to attempt to recognize a gesture performed by the object as represented in the stored image data.

* * * * *